United States Patent
Liu et al.

(10) Patent No.: US 10,267,174 B2
(45) Date of Patent: Apr. 23, 2019

(54) OUTER AIRSEAL ABRADABLE RUB STRIP

(71) Applicant: United Technologies Corporation, Farmington, CT (US)

(72) Inventors: Xuan Liu, Glastonbury, CT (US); Christopher W. Strock, Kennebunk, ME (US); Russell A. Beers, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 383 days.

(21) Appl. No.: 15/140,903

(22) Filed: Apr. 28, 2016

(65) Prior Publication Data

US 2017/0314410 A1 Nov. 2, 2017

(51) Int. Cl.
*F01D 11/08* (2006.01)
*F01D 11/12* (2006.01)
(Continued)

(52) U.S. Cl.
CPC .............. *F01D 11/122* (2013.01); *C22C 1/08* (2013.01); *C22C 19/058* (2013.01); *C23C 4/073* (2016.01); *C23C 4/126* (2016.01); *C23C 4/131* (2016.01); *C23C 4/134* (2016.01); *F01D 25/005* (2013.01); *F01D 25/18* (2013.01); *B22F 2998/10* (2013.01); *B22F 2999/00* (2013.01); *C22C 1/10* (2013.01); *F01D 5/288* (2013.01); *F05D 2220/32* (2013.01); *F05D 2230/311* (2013.01); *F05D 2230/60* (2013.01); *F05D 2240/11* (2013.01); *F05D 2300/175* (2013.01); *F05D 2300/177* (2013.01);
(Continued)

(58) Field of Classification Search
CPC .............. F01D 11/122; F05D 2230/90; F05D 2240/11; F05D 2300/132; F05D 2300/121
See application file for complete search history.

(56) References Cited

U.S. PATENT DOCUMENTS 3,519,282 A 7/1970 Davis
3,817,719 A 6/1974 Schilke et al.
(Continued)

FOREIGN PATENT DOCUMENTS

EP 1013782 A1 6/2000
EP 2375002 A2 10/2011
(Continued)

OTHER PUBLICATIONS

European Search Report dated Nov. 8, 2017 for European Patent Application No. 17167927.7.
(Continued)

*Primary Examiner* — Ninh H. Nguyen
(74) *Attorney, Agent, or Firm* — Bachman & LaPointe, P.C.

(57) ABSTRACT

A blade outer airseal has a body comprising: an inner diameter (ID) surface; an outer diameter (OD) surface; a leading end; and a trailing end. The airseal body has a metallic substrate and a coating system atop the substrate along at least a portion of the inner diameter surface. At least over a first area of the inner diameter surface, the coating system comprises an abradable layer comprising a metallic matrix and a solid lubricant; and the metallic matrix comprises, by weight, ≥35% nickel, 12.0-20.0% cobalt, 5.0-15.0% aluminum, and 5.0-15.0% chromium.

21 Claims, 3 Drawing Sheets

(51) Int. Cl.

| | | |
|---|---|---|
| *F01D 25/00* | (2006.01) | |
| *F01D 25/18* | (2006.01) | |
| *C23C 4/134* | (2016.01) | |
| *C23C 4/126* | (2016.01) | |
| *C23C 4/131* | (2016.01) | |
| *C23C 4/073* | (2016.01) | |
| *C22C 1/08* | (2006.01) | |
| *C22C 19/05* | (2006.01) | |
| *F01D 5/28* | (2006.01) | |
| *C22C 1/10* | (2006.01) | |

(52) U.S. Cl.
CPC ............ *F05D 2300/2282* (2013.01); *F05D 2300/509* (2013.01); *F05D 2300/514* (2013.01); *F05D 2300/6032* (2013.01); *F05D 2300/612* (2013.01); *F05D 2300/613* (2013.01); *F05D 2300/614* (2013.01); *Y02T 50/672* (2013.01)

(56) References Cited

U.S. PATENT DOCUMENTS

| | | | |
|---|---|---|---|
| 3,879,831 A | | 4/1975 | Rigney et al. |
| 4,273,824 A | * | 6/1981 | McComas ............... C23C 4/02 442/7 |
| 4,299,865 A | * | 11/1981 | Clingman ............ F01D 11/122 427/243 |
| 4,744,725 A | | 5/1988 | Matarese et al. |
| 5,561,827 A | * | 10/1996 | Reeves ............... B22F 1/0003 419/10 |
| 5,780,116 A | * | 7/1998 | Sileo .................... C23C 4/02 427/455 |
| 5,976,695 A | | 11/1999 | Hajmrle et al. |
| 6,533,285 B2 | | 3/2003 | Nava et al. |
| 6,969,231 B2 | | 11/2005 | Ghasripoor et al. |
| 8,650,753 B2 | | 2/2014 | Sellars et al. |
| 8,777,562 B2 | | 7/2014 | Strock et al. |
| 9,428,825 B1 | * | 8/2016 | Jablonski ............. C23C 16/405 |
| 2004/0226636 A1 | | 11/2004 | Bampton et al. |
| 2007/0205189 A1 | | 9/2007 | Grossklaus, Jr. et al. |
| 2012/0189434 A1 | | 7/2012 | Strock et al. |
| 2013/0078085 A1 | | 3/2013 | Strock et al. |
| 2016/0186595 A1 | | 6/2016 | Strock et al. |

FOREIGN PATENT DOCUMENTS

| | | |
|---|---|---|
| EP | 2444514 A1 | 4/2012 |
| EP | 2540868 A1 | 1/2013 |
| GB | 2317899 A | 4/1998 |
| WO | 95/12004 A1 | 5/1995 |
| WO | 2014/151101 A1 | 9/2014 |

OTHER PUBLICATIONS

European Search Report dated Nov. 13, 2017 for European Patent Application No. 17162495.0.

* cited by examiner

OUTER AIRSEAL ABRADABLE RUB STRIP

BACKGROUND

This disclosure relates to a gas turbine engine, and more particularly to gaspath leakage seals for gas turbine engines.

Gas turbine engines, such as those used to power modern commercial and military aircraft, generally include one or more compressor sections to pressurize an airflow, a combustor section for burning hydrocarbon fuel in the presence of the pressurized air, and one or more turbine sections to extract energy from the resultant combustion gases. The airflow flows along a gaspath through the gas turbine engine.

The gas turbine engine includes a plurality of rotors arranged along an axis of rotation of the gas turbine engine. The rotors are positioned in a case, with the rotors and case having designed clearances between the case and tips of rotor blades of the rotors. It is desired to maintain the clearances within a selected range during operation of the gas turbine engine as deviation from the selected range can have a negative effect on gas turbine engine performance. For each blade stage, the case typically includes an outer airseal located in the case immediately outboard (radially) of the blade tips to aid in maintaining the clearances within the selected range.

Within the compressor section(s), temperature typically progressively increases from upstream to downstream along the gaspath. Particularly, in relatively downstream stages, heating of the airseals becomes a problem. U.S. patent application Ser. No. 14/947,494, of Leslie et al., entitled "Outer Airseal for Gas Turbine Engine", and filed Nov. 20, 2015 ('494 application), the disclosure of which is incorporated by reference in its entirety herein as if set forth at length, discusses several problems associated with heat transfer to outer airseals and several solutions.

The airseal typically has an abradable coating along its inner diameter (ID) surface. In relatively downstream stages of the compressor where the blades have nickel-based superalloy substrates, the abradable coating material may be applied to a bondcoat along the metallic substrate of the outer airseal. For relatively upstream sections where the compressor blades comprise titanium-based substrates (a potential source of fire) systems have been proposed with a fire-resistant thermal barrier layer intervening between the bondcoat and the abradable material. An example of such a coating is found in U.S. Pat. No. 8,777,562 of Strock et al., issued Jul. 15, 2014 and entitled "Blade Air Seal with Integral Barrier".

SUMMARY

One aspect of the disclosure involves a blade outer airseal having a body. The body comprises: an inner diameter (ID) surface; an outer diameter (OD) surface; a leading end; and a trailing end. The airseal body has a metallic substrate and a coating system atop the substrate along at least a portion of the inner diameter surface. At least over a first area of the inner diameter surface, the coating system comprises an abradable layer comprising a metallic matrix and a solid lubricant; and the metallic matrix comprises, by weight, ≥50% nickel, 12.0-20.0% cobalt, 5.0-15.0% aluminum, and 5.0-15.0% chromium.

A further embodiment may additionally and/or alternatively include the metallic matrix comprising by weight ≥55% nickel.

A further embodiment may additionally and/or alternatively include the metallic matrix comprising by weight ≥55% nickel, 15.0-20.0% cobalt, 6.0-10.0% aluminum, and 8.0.0-12.0% chromium.

A further embodiment may additionally and/or alternatively include the metallic matrix comprising by weight at least 15.0% combined aluminum and chromium.

A further embodiment may additionally and/or alternatively include iron content of the metallic matrix being no more than 5.0% by weight.

A further embodiment may additionally and/or alternatively include, at 1200° F. the metallic matrix having: at least 98% by volume fcc and L12 phases combined with at least 30% L12.

A further embodiment may additionally and/or alternatively include, at 1200° F. the metallic matrix having: at least 98% by volume fcc and L12 phases combined with at least 40% L12.

A further embodiment may additionally and/or alternatively include the metallic matrix comprising, by weight: no more than 5.0% iron; no more than 5.0% combined of all other elements; and no more than 1.5% of any individual other element.

A further embodiment may additionally and/or alternatively include the metallic matrix further comprising, by weight: no more than 5.0% combined of all other elements; and no more than 1.5% of any individual other element.

A further embodiment may additionally and/or alternatively include the metallic matrix further comprising, by weight: no more than 0.5% combined of niobium, molybdenum, tantalum, tungsten, and rhenium.

A further embodiment may additionally and/or alternatively include the metallic matrix further comprising, by weight: ≤1.0% hafnium; ≤1.0% silicon; and ≤1.0% yttrium.

A further embodiment may additionally and/or alternatively include over the first area of the inner diameter surface, the coating system comprising the abradable layer and a thermal barrier layer between the abradable layer and the substrate.

A further embodiment may additionally and/or alternatively include the abradable layer having a volume content of said solid lubricant of 5.0% to 80%.

A further embodiment may additionally and/or alternatively include the solid lubricant comprising HBN.

A further embodiment may additionally and/or alternatively include the abradable layer having a volume content of said metallic matrix of 20% to 50%.

A further embodiment may additionally and/or alternatively include the abradable layer having less than 20% porosity.

A further embodiment may additionally and/or alternatively include one or more of: the coating system having a bondcoat between the abradable layer and the substrate; and the substrate being a nickel-based superalloy.

Another aspect of the disclosure involves a method for manufacturing the blade outer airseal, the method comprising: thermal spray of the abradable layer.

Another aspect of the disclosure involves a method for using the blade outer airseal, the method comprising: installing the blade outer airseal on a turbine engine; and running the turbine engine so that blade tips rub the abradable coating.

Another aspect of the disclosure involves a blade outer airseal having a body. The body comprises: an inner diameter (ID) surface; an outer diameter (OD) surface; a leading end; and a trailing end. The airseal body has a metallic substrate and a coating system atop the substrate along at least a portion of the inner diameter surface. At least over a first area of the inner diameter surface, the coating system comprises an abradable layer comprising a nickel-based metallic matrix and a solid lubricant; and at 1200° F. the metallic matrix has: at least 40% primary fcc; at least 40% by volume gamma prime (L12); and at most 10% by volume beta (B2) crystal structure.

A further embodiment may additionally and/or alternatively include a gas turbine engine compressor section comprising: a stage of blades having Ni-based substrates; and the blade outer airseal wherein the inner diameter (ID) surface faces tips of the blades.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
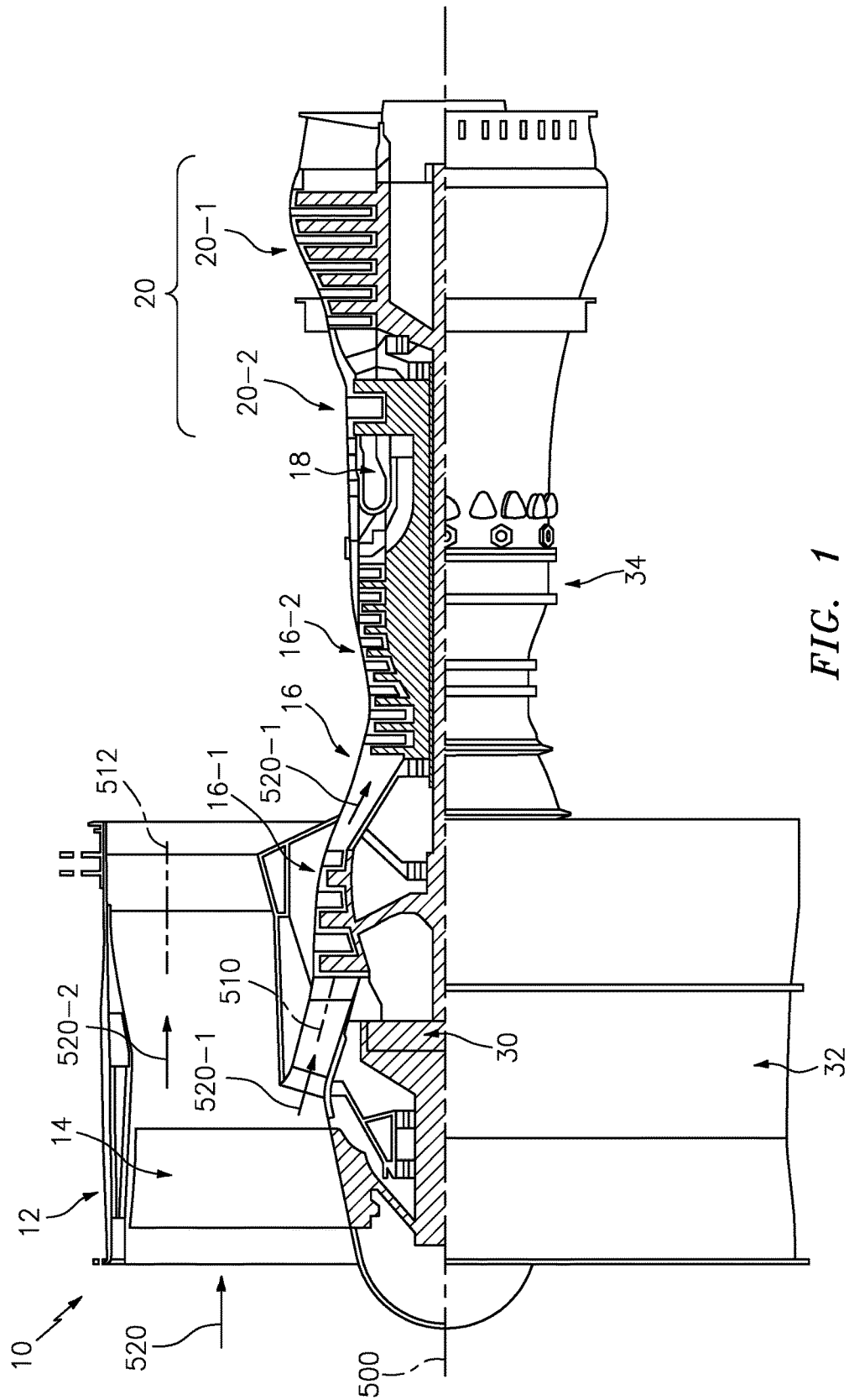
FIG. 1 is a schematic axial half cross-sectional view of an embodiment of a gas turbine engine.

FIG. 1 is a schematic illustration of a gas turbine engine 10. The illustrated engine is a turbofan used to produce propulsive thrust in aerospace applications. Broadly, relevant gas turbine engines may also include turbojets, turboprops, industrial gas turbines (IGT), and the like. For purposes of illustration, outer aerodynamic cases are not shown. The gas turbine engine has a central longitudinal axis 500. The gas turbine engine generally has a fan section 12 through which an inlet flow 520 of ambient air is propelled by a fan 14, a compressor 16 for pressurizing the air 520-1 received from the fan 14, and a combustor 18 wherein the compressed air is mixed with fuel and ignited for generating combustion gases. The inlet flow 520 splits into a first or core portion 520-1 flowing along the gaspath (core flowpath) 510 and a bypass portion 520-2 flowing along a bypass flowpath 512. The illustrated engine 10 and gross features of its airseals (discussed below) are based on a particular configuration shown in the aforementioned '494 application. Nevertheless, the teachings herein may be applied to other general engine configurations and other general airseal configurations.

The gas turbine engine 10 further comprises a turbine 20 for extracting energy from the combustion gases. Fuel is injected into the combustor 18 of the gas turbine engine 10 for mixing with the compressed air from the compressor 16 and ignition of the resultant mixture. The fan 14, compressor 16, combustor 18, and turbine 20 are typically all concentric about a common central longitudinal axis 500 of the gas turbine engine 10.

Depending upon the implementation, the compressor and turbine may each contain multiple sections. Each section includes one or more stages of rotor blades interspersed with one or more stages of stator vanes. The exemplary configuration has two compressor sections and two turbine sections. From upstream to downstream along the gaspath 510, these include a low pressure compressor section (LPC) 16-1, a high pressure compressor section (HPC) 16-2, a high pressure turbine section (HPT) 20-2, and a low pressure turbine section (LPT) 20-1. The exemplary rotors of the LPC and LPT are formed to rotate as a first unit or low pressure spool with the LPT driving the LPC. Similarly, the HPT and HPC rotors are arranged as a high pressure spool. The fan may be driven by the low pressure spool either directly or via a reduction gearbox 30. Other configurations are, however, known. Whereas illustrated in the context of compressors 16, one skilled in the art will readily appreciate that the present disclosure may be utilized with respect to turbines (e.g., an LPT where temperatures are relatively low).

Figure 2:
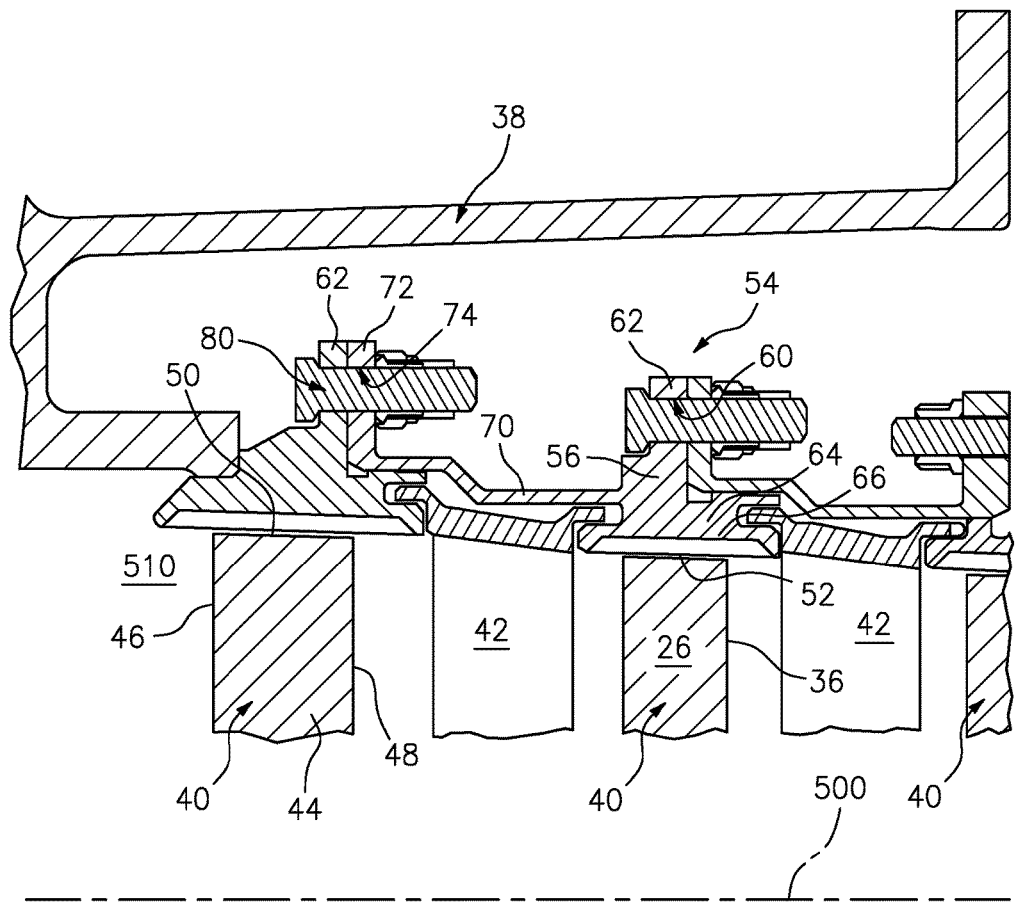
FIG. 2 is a schematic axial cross-sectional view of an embodiment of a compressor of the gas turbine engine.

The exemplary engine comprises a fan case 32 and a core case 34. The core case has sections along the corresponding sections of the engine core. FIG. 2 shows an HPC case section 38 of the core case 34 along the HPC.

FIG. 2 schematically shows several stages of blades 40 of the HPC rotor. Interspersed with the blades are stages of stator vanes 42. Each blade has an airfoil 44 having a leading edge 46, a trailing edge 48, a pressure side (not shown) and a suction side (not shown) and extends from an inboard end to an outboard tip 50. The tip 50 is in close facing proximity to an inner diameter (ID) surface 52 of an outer airseal 54. Each exemplary outer airseal 54 includes a metallic substrate 56 and an abradable coating system (or rub strip) 58 (FIG. 2A) forming the ID surface 52 along an ID surface of the substrate.

The exemplary outer airseal 54 is formed as a generally full annulus (e.g., locally interrupted by mounting features such as a circumferential array of holes 60 in a radially outwardly extending flange 62). In cross-section, the exemplary outer airseals 54 comprise an inboard body or band 64 comprising a body or band 66 of the substrate and the rub strip 58 inboard thereof. The flange 62 extends radially outward from the band 66. For mounting the exemplary airseals, at a forward end of the flange 62, an axial collar portion 70 extends forwardly to terminate in a radially outward extending flange 72. The flange 72 has mounting holes 74 complementary to mounting holes of an adjacent mating flange. FIG. 2 shows several airseal stages associated with respective blade stages. Each flange 72 may mate to a flange 62 of the next forward airseal and be secured thereto via fasteners (e.g., threaded fasteners) 80.

Figure 2A:
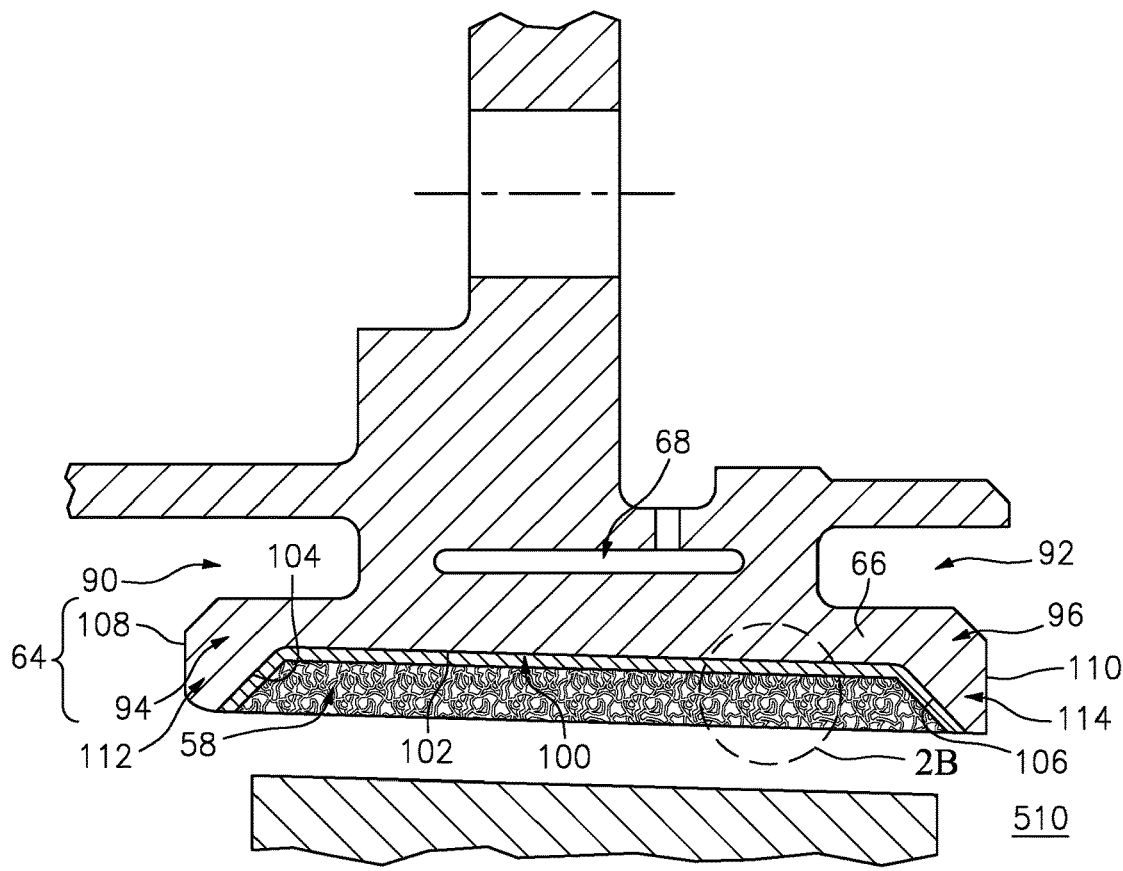
FIG. 2A is a schematic axial cross-sectional view of an embodiment of an outer airseal of the compressor of the a gas turbine engine at detail 2A of FIG. 2.

FIG. 2A further shows respective fore and aft channels 90 and 92 outboard of corresponding cantilevered portions 94 and 96 of the substrate band 66 for capturing associated flanges of adjacent stages of stator segments.

As is discussed in aforementioned '494 application, heat transfer to the flanges 62 and 72 is a source of problems. Steps that have been undertaken to address this include: making the flange 62 appropriately massive; and adding cooling features 68 such as those in the '494 application. The massiveness of the flange 62 functions in several ways. First, for a given amount of heat transfer to the band 66, and thus from the band to the flange 62, the temperature increase experienced by the flange will be smaller for more massive flanges. Second, a more massive flange 62 can more easily mechanically resist expansion caused by heating of the band 66 due to greater strength of the more massive flange.

As is discussed below, however, the rub strip 58 may be configured to influence heat transfer from the gaspath 510 ultimately to the flange 62. In various implementations, use of the rub strip to assist in thermal management may allow reduced massiveness of the flange and/or may allow reduction or elimination of cooling features such as those shown in the '494 application. Nevertheless, the thermal management associated with the rub strip 58 may be used in conjunction with such other features.

The exemplary rub strip 58 (FIG. 2A) is located in an inwardly (radially) open annular channel 100 or well in the substrate band portion 66. The channel has a surface comprising a base surface 102 and respective fore and aft surfaces 104 and 106.

The band 66 extends from a forward rim 108 to an aft rim 110 and has forwardmost and aftmost portions 112 and 114 respectively forward of and behind the channel 100.

Figure 2B:
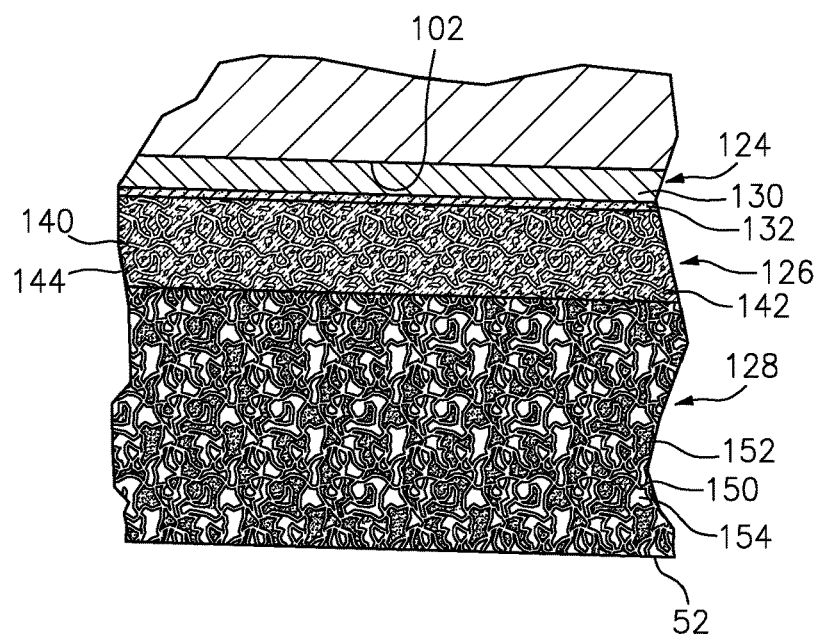
FIG. 2B is a coating cross section at detail 2B of FIG. 2A.

The rub strip 58 may be formed with multiple layers. A base layer 124 (FIG. 2B) may be a bondcoat atop an inner diameter (ID) surface portion of the substrate band formed by the channel surfaces (102, 104, 106). An optional thermal barrier coating (TBC) layer 126 is at least locally atop the bondcoat. An abradable layer 128 is at least locally atop the TBC layer (or atop the bondcoat if no TBC layer or otherwise positioned). The abradable layer 128 may represent modification of any appropriate prior art or future abradable layer composition but featuring matrix alloy discussed below. The TBC layer 126, if present, may be selected for insulative purposes to limit or tailor the flow of heat from the gaspath 510 to the substrate 56.

The exemplary bondcoat 124 includes a base layer 130 and a thermally grown oxide (TGO) layer 132. The base layer and TGO layer may originally be deposited as a single precursor layer. There may be diffusion with the substrate. The TGO layer may reflect oxidation of original material of the precursor. Exemplary base layer thicknesses are 10-400 micrometers, more narrowly 20-200 micrometers. Exemplary TGO layer thicknesses are 0.05-1 micrometers, more narrowly 0.1-0.5 micrometers. Alternative bondcoats include diffusion aluminides.

An exemplary coating process includes preparing the substrate (e.g., by cleaning and surface treating). A precursor of the bondcoat is applied. An exemplary application is of an MCrAlY, more particularly a NiCoCrAlY material. An exemplary MCrAlY is Ni 23Co 17Cr 12Al 0.5Y. An exemplary application is via a spray (e.g., a thermal spray) from a powder source. Exemplary application is via air plasma spray (APS). Alternative methods include a high-velocity oxy-fuel (HVOF) process, a high-velocity air-fuel (HVAF) process, a low pressure plasma spray (LPPS) process, or a wire-arc process.

An exemplary application is to a thickness of 0.003-0.010 inch, (76-254 micrometers) more broadly 0.001-0.015 inch (25-381 micrometers).

After the application, the precursor may be diffused. An exemplary diffusion is via heating (e.g., to at least 1900° F. (1038° C.) for a duration of at least 4 hours) in vacuum or nonreactive (e.g., argon) atmosphere. The exemplary diffusion may create a metallurgical bond between the bondcoat and the substrate. Alternatively diffusion steps may occur after applying the TBC, if at all.

After application of the bondcoat precursor, if any, the substrate may be transferred to a coating apparatus for applying the TBC 126, if any, and abradable layer 128. An exemplary application is via a spray (e.g., a thermal spray) from a powder source. Exemplary application is via air plasma spray (APS). Alternative methods include a high-velocity oxy-fuel (HVOF) process, a high-velocity air-fuel (HVAF) process, a low pressure plasma spray (LPPS) process, or a wire-arc process. Alternative techniques involve consolidated and sintered powder including pressing, tape casting, and vibratory consolidation. These may include direct write, DMLS and laser fusing 3D printing with or without binders. As an alternative to in situ formation directly on the substrate (optionally with a bond coat or other layer(s)) pre-formed layers may be brazed or adhesively bonded or otherwise to the substrate (or to an intervening layer).

An exemplary TBC 126 comprises a single ceramic-containing layer of a single nominal composition. Multi-layer and graded composition embodiments are also possible. An exemplary abradable layer 128 is a metal matrix composite. An exemplary metal matrix composite comprises the metal (alloy) matrix, a solid lubricant, and porosity.

The exemplary TBC 126 contains metal (alloy) 140 and porosity 142 in addition to the ceramic 144. The exemplary by volume content of metal in the TBC is less than in the abradable layer.

Within the TBC 126, an exemplary ratio of ceramic 144 to metal 140 by volume is between 3:1 and 50:1, more particularly between 5:1 and 20:1 or between 5:1 and 10:1 or an exemplary about 7:1. An exemplary remainder (e.g., porosity plus solid lubricant in some embodiments as discussed below) is up to 70% by volume, more particularly 2% to 70%, or 5% to 60% or 20% to 50% or 30% to 45% or an exemplary about 40%.

The ceramic 144 (e.g., a stabilized zirconia such as a yttria-stabilized zirconia (YSZ), particularly 7YSZ) contributes to the composite low conductivity and strength. The metal 140 greatly increases toughness and spallation resistance. Porosity (if any) created inherently by the application (e.g., spray) process and/or via addition of a fugitive filler material further reduces conductivity, but also contributes to reduced elastic modulus, coating stress and tendency to spall (i.e., both the metallic content and porosity increase the possible thickness of the TBC 126 and therefore maximum thermal resistance of the system). At some point with increasing porosity the TBC gets weak and allows abradable spallation. To mitigate this, the TBC may be selected to be stronger than the abradable.

The exemplary abradable layer 128 contains metal (alloy) 150 and a solid lubricant 152. It may further contain porosity 154.

A very broad range of relative contents of solid lubricant and porosity are possible in the abradable layer 128. Within the abradable layer 128, an exemplary by volume content of the metal is 20% to 50%, more particularly 25% to 40%, or an exemplary about 35%. An exemplary porosity is up to 70% by volume, more particularly 1.0% to 70%, or 1.0% to 40%, or 1.0% to 30%; or 10% to 30% or 15% to 30% or an exemplary about 20% in embodiments that have significant porosity. Other embodiments may target low porosity (e.g., 0% to 10% or 1% to 6% or 2% to 4%) with high solid lubricant content. Exemplary solid lubricant 152 volumetric contents are at least 5% or at least 20% or an exemplary 20% to 60% in higher porosity layers and 60% to 80% or 70% to 80% or 75% to 80% in the low porosity embodiments.

In the low porosity abradable layer embodiments, porosity may be lower in the abradable layer than in the TBC (substantially lower in embodiments where the TBC or a main portion thereof does not include any of the solid lubricant but has only the ceramic, metal, and porosity). In either situation, the abradable layer would have lower cohesive bond strength than the TBC. In embodiments where the cohesive strength of the abradable layer is equal to or higher than that of the TBC, the risk of sheet spallation from the TBC would be unacceptable.

Exemplary solid lubricants include hexagonal boron nitride (hBN) (e.g., commercially pure hBN or a mixture such as 10 wt % bentonite agglomerated hBN). The selection of porosity to hBN ratio may involve both engine operational requirements and economics. HBN is relatively expensive compared with porosity formers. Whereas high porosity coating versions will be lower cost to produce, the resultant roughness and porosity of the coating may cause greater aerodynamic losses than those with relatively lower porosity and higher hBN content. In order to improve the economics of low porosity, high hBN coatings, a binder material such as bentonite may be used to improve the deposition efficiency of the hBN.

In many aerospace applications the benefit of improved aerodynamic efficiency greatly outweighs the added manufacturing cost of using high hBN content as opposed to porosity formers. For example, the erosion resistance and abradability of a coating containing 28% by volume metal matrix may be desirable for a given application. If the coating were made with hBN content of about 70% and porosity of about 2%, the resultant coating would have low gas permeability and low surface roughness compared with a similar coating of high porosity. That high porosity coating would for example be 28% metal matrix plus 72% porosity after a fugitive constituent such as methylmethacrylate is burned out. A turbine compressor stage with the high hBN, relatively dense coating, would have about 1% greater compressor stage efficiency than the porous version. This 1% efficiency difference provides thousands of dollars' worth of fuel savings over the life of an engine. In contrast, the added manufacturing cost may be on the order of a few hundred dollars. In contrast, in the land based industrial gas turbine (IGT) industry, turbine diameter is relatively large. As diameter increases, power increases faster as a function of diameter increase than do the surface roughness aerodynamic losses around the outer diameter of the turbine. Thus, the efficiency of the larger diameter IGT turbines is less sensitive to the surface aerodynamic losses. With the high emphasis on low initial cost in the IGT industry, the less expensive high porosity version of the abrdable is likely to be chosen.

Even in the high porosity coating versions it is desirable to include at least some solid lubricant phase, on the order of 5% by volume. The solid lubricant contributes to particle liberation during rub events. In contrast, with no solid lubricant, there is an increased tendency for metal smearing that creates a fully dense metal layer on the abradable. When this occurs, blade wear increases and abradability is diminished.

In comparison with fused and crushed pure hBN, hBN agglomerated with bentonite binder is used more efficiently in the thermal spray process. The pure hBN material is fused and crushed with irregular particle shape. The pure material also does not have a melting point under atmospheric conditions. This means that not only is the powder difficult to feed uniformly to the plasma spray process, but it does not melt to facilitate adhesion and deposition in the form of a coating. With the addition of bentonite to hBN (5% to 15% of the hBN weight), a slurry of the mixture can be made that can be spray dried into agglomerates that are substantially round and well suited to the powder feed methods used in thermal spray. These agglomerates may be further heat treated to calcine the bentonite to drive off the water portion of the hydrated molecules that makeup the bentonite. This thermal treatment helps to make the agglomerates more durable to handling and reduces gas evolution during the heating of the thermal spray process. During the thermal spray process, most desirably air plasma spray, the bentonite component of the agglomerates melts and facilitates adhesion to form the coating. The resultant deposition process for the agglomerated hBN is about three times as efficient as for the pure crushed hBN.

An exemplary ratio of abradable layer volumetric metal content to TBC volumetric metal content is between 1.5:1 and 15:1, more particularly between 2:1 and 10:1, or an exemplary 5:1. In one group of examples, the metal (alloy) of the TBC is the same as that of the abradable. Use of the same alloy across both layers has advantages of minimizing chances for galvanic corrosion and limiting differential thermal expansion and may otherwise aid inter-layer adhesion.

In another group of examples, the metal (alloy) of the TBC is the same as that of the bondcoat (optionally different from that of the abradable layer). Similar advantages attend this as having the same alloy across the TBC and abradable layers.

Table I below shows a family of alloys believed to have advantageous properties for use in at least the abradable layer 128. The percentages are overall percentages in the deposited matrix and overall percentages in source material. When phases form in the deposited matrix, there will be variations in composition between the different phases.

TABLE I

| | Matrix Alloys (weight percentages) | | | | | | | |
|---|---|---|---|---|---|---|---|---|
| | Element | | | | | | | |
| | Ni | Co | Cr | Al | Hf | Si | Y | Al + Cr |
| Ex. 1 | Bal. | 17 | 10 | 8 | 0.3 | 0.3 | 0.8 | |
| Range 1 | Bal. | 12.0-22.0 | 5.0-15.0 | 5.0-15.0 | 0-1.0 | 0-1.0 | 0-1.0 | ≥15.0 |
| Range 2 | Bal. | 15.0-20.0 | 8.0-12.0 | 6.0-10.0 | 0.1-0.5 | 0.2-0.5 | 0.4-1.0 | ≥15.0 |
| Range 3 | Bal. | 16.0-18.0 | 9.0-11.0 | 7.0-9.0 | 0.1-0.5 | 0.2-0.5 | 0.4-1.0 | |

The Ni balance in the table above may be subject to variations including components not in the table as is discussed below. Composition and processing parameters may be selected to provide ductile multi-phase fcc and L12 crystal structure at a reference temperature of 1200° F. (649° C.) and up to the onset of melting of the matrix at about 1300° C. to 1400° C. This may be close to the melting point of the blade alloy. Potentially, the matrix may have a higher melting point than the blade alloy. Key embodiments are nearly entirely fcc and L12 (e.g., at least at least 90% combined by volume or at least 95% or at least 98%) and, more particularly high L12. L12 volumetric content (e.g., at least 30% or at least 40% or at least 45%) may even exceed fcc (e.g., at least at least 40% or 45% or at least 50% or at least 55%).

These phases may account for at least 98.0% by volume or at least 99.0%. Miscellaneous material including oxides may account for the rest. Thus, exemplary B2, if any, may be an exemplary at most 10% volumetric in the alloy, more particularly at most 2.0% or at most 1.0% or even less such as at most 0.5%.

The ductility of the fcc and L12 phases (vs. hardness of B2) is advantageous when interfacing with a blade lacking an abrasive tip (i.e. the abradable coating interfaces directly with blade substrate superalloy). An exemplary nickel-based blade superalloy substrate is IN718.

With traditional CoNiCrAlY abradables, during the rub event, the hard B2 phase can wear the IN718 blade material and cause damage. The more ductile L12 intermetallic phase embedded in a soft Ni-fcc matrix is advantageous for interfacing with the blade substrate. These phases are similar to those present in the blade superalloy but are mechanically weaker to prevent damage to the blade material.

In one or more embodiments, advantageous features of these alloys are: they are ductile and tough to resist erosion and cracking in the operating temperature range; they have lower yield strength than blade material (e.g., IN718) at all operating temperatures; there are little to no phase changes over the operating temperature range to cause thermal cycle induced failure; they have good corrosion and oxidation resistance at operating temperature to protect the alloy itself.

At one exemplary rub temperature of 1200° F., IN718 in one exemplary forged and aged condition has a yield strength (0.2% offset) of 132.5 ksi (914 MPa) and an ultimate tensile strength (UTS) of 150.0 ksi (1034 MPa). To interface with such a substrate, exemplary alloys might have a yield strength no more than 80 ksi (551 MPa) and a UTS of no more than 100 ksi (689 MPa) at said temperature, both being substantially lower than those of the substrate (e.g., more than 30% lower with some being at least 40% lower).

The matrix alloy should not form an excess of intermetallic compounds which will reduce ductility and durability.

The material may be particularly useful in addressing blade wear in relatively downstream stages of an HPC without adding abrasive blade tips while achieving good abradability and erosion resistance. The high temperature softness may represent an improvement from prior CoNi-CrAlY abradable matrix that relied on weak interparticle bonding to achieve abradability.

The table shows several ranges around a specific example. Ce, La, and Zr may also substitute for the Hf, Si, and/or Y. These six elements can add additional oxidation resistance, but must be limited to prevent excessive formation of intermetallic compounds that will harden and make the material more brittle. In some embodiments, these six elements may aggregate to ≤3.5 weight % or ≤3.0 weight % or ≤2.5 weight % or ≤2.0 weight %.

For each of these basic alloys or ranges, further variations may include limits on Nb+Mo+Ta+W+Re (e.g., ≤0.5) and/or elements other than those listed (e.g., also ≤0.5 or broader ranges discussed below).

Ni17Co10Cr8Al (nominal weight %) is derived to be a two-phase ductile alloy with very little or no third phase present. The two phases present are ductile fcc (disordered crystal structure) and L12 phases (ordered crystal structure). In atomic percent, the center of the composition range of this alloy (ignoring impurities and additions) is 15.8% Al, 15.3% Co, 10.2% Cr, balance Ni (atomic %). Having an Al+Cr content in excess of 20 atomic % may provide that a stable adherent aluminia/chromia protective oxide layer forms when the alloy is exposed to temperatures in excess of 1200° F. in an oxygen-rich environment such as a turbine engine compressor. Lower atomic percentages will still be effective (e.g., at least about 15%). For example, the nominal Ni17Co10Cr8Al has atomic % Al+Cr of about 26.0%. Thus, exemplary Al+Cr atomic percent is 20.0% to 32.0% or 22.0% to 30%.

In view of partial known substitutability of iron for cobalt and nickel, there may be a greater tolerance for iron additions than other elements. Nevertheless, exemplary iron content may be up to 5.0% or 4.0% or 3.0%. Or, iron may be treated with the other elements and subject to the catch-all limits on constituents other than those listed. For example, a catch-all limit may be up to 5.0 weight percent aggregate or 4.0% or 3.0%. Other limits on individual additional elements may be 2.0%, 1.5%, 1.0% or 0.5%, if any.

In the various alloys, there may be additions of Hf, Si, and/or Y (or the Ce, La, and/or Zr noted above and subject to similar limits). Hf, Si, and Y are highly reactive elements (RE) in the presence of oxygen and aid in the formation of an adherent protective oxide scale (the aforementioned alumina-chromia) during high temperature oxidation. Additionally, these reactive elements slow down the growth kinetics of the oxides which prevents excessive oxide growth. Excessive oxide growth can be detrimental to rub behavior. However, Hf, Si, and Y contents must be kept below about one weight % each or excessive growth of hafnium-oxide, silicon-oxide and yttrium-oxide can occur. Such growth competes with the alumina and chromia. The RE oxides have needle-like morphology and thus do not provide the protective barrier function of alumina and chromia.

Additions of refractory elements can precipitate other brittle phases which are detrimental to rub behavior. Thus, as noted above, the alloys in the table above may be further defined by a combined Nb+Mo+Ta+W+Re content of less than or equal to 0.50 weight percent.

An exemplary application process involves a thermal spray process (e.g., air plasma spray) in a single spray chamber to apply the TBC 126 and abradable layer 128. In one group of examples: a first premixed powder contains powders of the metal 140, ceramic 144, and a fugitive (e.g., polymeric such as an aromatic crystalline polyester or methyl methacrylate); and a second premixed powder contains powders of the metal 150, solid lubricant 154, and a fugitive (e.g., polymeric such as an aromatic crystalline polyester or methyl methacrylate). The spray torch may be switched between sources of the first powder and second powder to sequentially apply the TBC 126 and abradable layer 128. Post-spray bakeout may remove the fugitive to leave the porosity 142 and 154.

An exemplary thickness of the TBC 126 is 0.010 inch to 0.080 inch (0.25 millimeter to 2.0 millimeter), more particularly, 0.020 inch to 0.060 inch (0.51 millimeter to 1.5 millimeter). An exemplary thickness of the abradable layer 128 is 0.010 inch (0.25 millimeter) to 0.16 inch (4.1 millimeters) or 0.020 inch (0.51 millimeter) to 0.10 inch (2.5 millimeters) or about 0.040 inch (1.0 millimeter) to 0.080 inch (2.0 millimeters). Depthwise transition zones may be present. For example, there may be a brief interval in a spray process when both the first powder source and second powder source are active. In situations without the TBC layer 126, exemplary abradable thickness is 0.030 inch (0.76 millimeter) to 0.080 inch (2.0 millimeters). In some examples the abradable may be advantageous at layer thickness of as low as 0.015 inch (0.38 millimeter) or as thick as 0.300 inch (7.6 millimeters). This depends primarily on the size of the engine.

A further variation involves a first source comprising the ceramic and optionally a fugitive and the second source comprising the metal, solid lubricant, and optionally fugitive. The first source and second source together are used to spray the TBC; the second source alone is used to spray the abradable layer. There may be a graded transition as flow from the first source is decreased and/or the second source is increased. As mentioned above, this allows some of the porosity found in a TBC lacking the solid lubricant to be filled with the solid lubricant. Providing the graded transition or allowing the TBC to include the solid lubricant is not believed to have performance advantages but may have manufacturing economy advantages.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A blade outer airseal having:
   a body comprising:
      an inner diameter (ID) surface;
      an outer diameter (OD) surface;
      a leading end;
      a trailing end;
      a metallic substrate; and
      a coating system atop the substrate along at least a portion of the inner diameter surface,
   wherein:
      at least over a first area of the inner diameter surface, the coating system comprises an abradable layer comprising a metallic matrix and a solid lubricant;
      at 1200° F. the metallic matrix has at least 98% by volume fcc and L12 phases combined with at least 30% L12; and
      the metallic matrix comprises, by weight:
         ≥50% nickel;
         12.0-20.0% cobalt;
         5.0-15.0% aluminum; and
         5.0-15.0% chromium.

2. The blade outer airseal of claim 1 wherein the metallic matrix comprises, by weight:
   ≥55% nickel.

3. The blade outer airseal of claim 1 wherein the metallic matrix comprises, by weight:
   ≥55% nickel;
   15.0-20.0% cobalt;
   6.0-10.0% aluminum; and
   8.0-12.0% chromium.

4. The blade outer airseal of claim 1 wherein the metallic matrix comprises, by weight:
   at least 15.0% combined aluminum and chromium.

5. The blade outer airseal of claim 1 wherein an iron content of the metallic matrix is no more than 5.0% by weight.

6. The blade outer airseal of claim 1 wherein at 1200° F. the metallic matrix has:
   at least 98% by volume fcc and L12 phases combined with at least 40% L12.

7. The blade outer airseal of claim 1 wherein the metallic matrix further comprises, by weight:
   no more than 4.0% iron
   no more than 5.0% combined of all other elements; and
   no more than 1.5% of any individual other element.

8. The blade outer airseal of claim 1 wherein the metallic matrix further comprises, by weight:
   no more than 5.0% combined of all other elements; and
   no more than 1.5% of any individual other element.

9. The blade outer airseal of claim 1 wherein the metallic matrix further comprises, by weight:
   no more than 0.5% combined of niobium, molybdenum, tantalum, tungsten, and rhenium.

10. The blade outer airseal of claim 1 wherein the metallic matrix further comprises, by weight:
    ≤1.0% hafnium;
    ≤1.0% silicon; and
    ≤1.0% yttrium.

11. The blade outer airseal of claim 1 wherein:
    over the first area of the inner diameter surface, the coating system comprises the abradable layer and a thermal barrier layer between the abradable layer and the substrate.

12. The blade outer airseal of claim 1 wherein:
    the abradable layer has a volume content of said solid lubricant of 5.0% to 80%.

13. The blade outer airseal of claim 1 wherein:
    the solid lubricant comprises HBN.

14. The blade outer airseal of claim 1 wherein:
    the abradable layer has a volume content of said metallic matrix of 20% to 50%.

15. The blade outer airseal of claim 1 wherein:
    the abradable layer has less than 20% porosity.

16. The blade outer airseal of claim 1 wherein one or more of:
    the coating system has a bondcoat between the abradable layer and the substrate; and
    the substrate is a nickel-based superalloy.

17. A method for manufacturing the blade outer airseal of claim 1, the method comprising:
    thermal spray of the abradable layer.

18. A method for using the blade outer airseal of claim 1, the method comprising:
    installing the blade outer airseal on a turbine engine; and
    running the turbine engine so that blade tips rub the abradable layer.

19. A blade outer airseal having:
    a body comprising:
       an inner diameter (ID) surface;
       an outer diameter (OD) surface;
       a leading end;
       a trailing end;
       a metallic substrate; and
       a coating system atop the substrate along at least a portion of the inner diameter surface,
    wherein:
       at least over a first area of the inner diameter surface, the coating system comprises an abradable layer comprising a nickel-based metallic matrix and a solid lubricant; and
       at 1200° F. the metallic matrix has:
          at least 40% primary fcc;
          at least 40% by volume gamma prime (L12); and
          at most 10% by volume beta (B2) crystal structure.

20. A gas turbine engine compressor section comprising:
a stage of blades having Ni-based substrates; and
the blade outer airseal of claim 19 wherein the inner diameter (ID) surface faces tips of the blades.

21. The gas turbine engine compressor section of claim 20 wherein the metallic matrix comprises, by weight:
≥50% nickel;
12.0-20.0% cobalt;
5.0-15.0% aluminum;
5.0-15.0% chromium;
no more than 4.0% iron;
no more than 5.0% combined of all other elements; and
no more than 1.5% of any individual other element.

* * * * *